(12) United States Patent
Siman et al.

(10) Patent No.: US 11,087,002 B2
(45) Date of Patent: Aug. 10, 2021

(54) USING THE SAME QUERY LANGUAGE FOR STATIC AND DYNAMIC APPLICATION SECURITY TESTING TOOLS

(71) Applicant: CHECKMARK LTD., Ramat Gan (IL)

(72) Inventors: Maty Siman, Tel Aviv (IL); Alexander Roichman, Petah Tikva (IL); Shimon Eshkenazi, Bat-Yam (IL)

(73) Assignee: CHECKMARX LTD., Ramat Gan (IL)

( * ) Notice: Subject to any disclaimer, the term of this patent is extended or adjusted under 35 U.S.C. 154(b) by 464 days.

(21) Appl. No.: 15/973,564

(22) Filed: May 8, 2018

(65) Prior Publication Data

US 2018/0330102 A1 Nov. 15, 2018

Related U.S. Application Data

(60) Provisional application No. 62/503,970, filed on May 10, 2017.

(51) Int. Cl.
*G06F 21/57* (2013.01)
*G06F 16/242* (2019.01)
*G06F 11/36* (2006.01)

(52) U.S. Cl.
CPC ........ *G06F 21/577* (2013.01); *G06F 11/3672* (2013.01); *G06F 16/2433* (2019.01); *G06F 2221/033* (2013.01)

(58) Field of Classification Search
CPC ... H04L 63/02; G06F 21/577; G06F 2221/033
USPC ......................................................... 726/25
See application file for complete search history.

(56) References Cited

U.S. PATENT DOCUMENTS

| | | |
|---|---|---|
| 4,989,470 A | 2/1991 | Bulgrien |
| 5,107,418 A | 4/1992 | Cramer et al. |
| 5,353,662 A | 10/1994 | Vaughters |
| 5,450,768 A | 9/1995 | Bulgrien et al. |
| 5,485,616 A | 1/1996 | Burke et al. |
| 5,586,328 A | 12/1996 | Caron et al. |
| 5,586,330 A | 12/1996 | Knudsen et al. |

(Continued)

FOREIGN PATENT DOCUMENTS

| | | |
|---|---|---|
| CA | 2200812 A1 | 9/1998 |
| JP | 2003050722 A | 2/2003 |

(Continued)

OTHER PUBLICATIONS

European Application # 17769530.1 search report dated Oct. 18, 2019.

(Continued)

*Primary Examiner* — Bryan F Wright
(74) *Attorney, Agent, or Firm* — Kligler & Associates Patents Attorneys Ltd (57) ABSTRACT

A computer program is evaluated for security vulnerabilities by formulating a query in a query language and receiving into a memory of a computer source code of the computer program to be analyzed, preparing a data flow graph from the source code, and determining that the query is satisfied by an analysis of the data flow graph. Alternatively, the computer program is evaluated by collecting runtime events during an execution of binary code and determining that the query is satisfied by an analysis of the runtime events. In either case a security vulnerability is reported.

16 Claims, 3 Drawing Sheets

(56) References Cited

U.S. PATENT DOCUMENTS

| | | | |
|---|---|---|---|
| 5,701,489 A | 12/1997 | Bates et al. | |
| 5,742,811 A | 4/1998 | Agrawal et al. | |
| 5,778,233 A | 7/1998 | Besaw et al. | |
| 5,790,858 A | 8/1998 | Vogel | |
| 5,875,334 A | 2/1999 | Chow et al. | |
| 5,881,290 A | 3/1999 | Ansari et al. | |
| 5,978,588 A | 11/1999 | Wallace | |
| 6,226,787 B1 * | 5/2001 | Serra | G06F 11/3664 |
| | | | 714/E11.217 |
| 6,442,748 B1 | 8/2002 | Bowman-Amuah | |
| 7,210,133 B2 | 4/2007 | Souloglou et al. | |
| 7,237,265 B2 | 6/2007 | Reshef et al. | |
| 7,284,274 B1 | 10/2007 | Walls et al. | |
| 7,363,616 B2 | 4/2008 | Kalyanaraman | |
| 7,392,545 B1 | 6/2008 | Weber et al. | |
| 7,447,666 B2 | 11/2008 | Wang | |
| 7,500,410 B2 | 3/2009 | Tsuji | |
| 7,565,631 B1 | 7/2009 | Banerjee et al. | |
| 7,647,631 B2 | 1/2010 | Sima | |
| 7,860,842 B2 | 12/2010 | Bronnikov et al. | |
| 7,861,226 B1 | 12/2010 | Episkopos et al. | |
| 7,971,193 B2 | 6/2011 | Li et al. | |
| 7,975,296 B2 | 7/2011 | Apfelbaum et al. | |
| 8,230,499 B1 | 7/2012 | Pereira | |
| 8,510,237 B2 | 8/2013 | Cascaval et al. | |
| 8,656,364 B1 * | 2/2014 | Kolawa | G06F 8/74 |
| | | | 717/126 |
| 8,819,772 B2 | 8/2014 | Bettini et al. | |
| 8,844,043 B2 | 9/2014 | Williams et al. | |
| 8,881,288 B1 | 11/2014 | Levy et al. | |
| 8,949,271 B2 | 2/2015 | Kocher et al. | |
| 9,097,329 B2 | 8/2015 | Viitasalo et al. | |
| 9,128,728 B2 | 9/2015 | Siman | |
| 9,140,345 B2 | 9/2015 | Dix et al. | |
| 9,141,806 B2 | 9/2015 | Siman | |
| 9,261,180 B2 | 2/2016 | Rintoo | |
| 9,317,399 B2 | 4/2016 | Boshernitsan et al. | |
| 9,556,954 B2 | 1/2017 | Hou et al. | |
| 9,882,930 B2 | 1/2018 | Holt | |
| 9,946,880 B2 | 4/2018 | Lee et al. | |
| 2002/0178281 A1 | 11/2002 | Aizenbud-Reshef et al. | |
| 2003/0056192 A1 | 3/2003 | Burgess | |
| 2004/0088689 A1 | 5/2004 | Hammes | |
| 2004/0205411 A1 | 10/2004 | Hong et al. | |
| 2004/0255277 A1 | 12/2004 | Berg | |
| 2005/0015752 A1 | 1/2005 | Alpern et al. | |
| 2005/0198626 A1 | 9/2005 | Kielstra et al. | |
| 2005/0204344 A1 | 9/2005 | Shinomi | |
| 2005/0257207 A1 | 11/2005 | Blumfield et al. | |
| 2005/0273861 A1 | 12/2005 | Chess et al. | |
| 2006/0070048 A1 | 3/2006 | Li et al. | |
| 2006/0085858 A1 | 4/2006 | Noel et al. | |
| 2006/0212941 A1 * | 9/2006 | Bronnikov | G06F 21/577 |
| | | | 726/24 |
| 2006/0253841 A1 | 11/2006 | Rioux | |
| 2006/0282453 A1 | 12/2006 | Tjong et al. | |
| 2007/0006170 A1 | 1/2007 | Hasse et al. | |
| 2007/0016949 A1 | 1/2007 | Dunagan et al. | |
| 2007/0044153 A1 | 2/2007 | Schuba et al. | |
| 2007/0074169 A1 | 3/2007 | Chess et al. | |
| 2007/0074188 A1 * | 3/2007 | Huang | G06F 21/54 |
| | | | 717/141 |
| 2007/0083933 A1 | 4/2007 | Venkatapathy et al. | |
| 2007/0143759 A1 | 6/2007 | Ozgur et al. | |
| 2007/0239606 A1 | 10/2007 | Eisen | |
| 2007/0294281 A1 | 12/2007 | Ward et al. | |
| 2008/0209276 A1 | 8/2008 | Stubbs et al. | |
| 2008/0276317 A1 | 11/2008 | Chandola et al. | |
| 2009/0019545 A1 | 1/2009 | Ben-Itzhak et al. | |
| 2009/0094175 A1 | 4/2009 | Provos et al. | |
| 2009/0113550 A1 | 4/2009 | Costa et al. | |
| 2009/0183141 A1 | 7/2009 | Tai et al. | |
| 2009/0187992 A1 | 7/2009 | Poston | |
| 2009/0254572 A1 | 10/2009 | Redlich et al. | |
| 2009/0300764 A1 | 12/2009 | Freeman | |
| 2010/0011441 A1 | 1/2010 | Christodorescu et al. | |
| 2010/0043072 A1 | 2/2010 | Rothwell | |
| 2010/0050260 A1 | 2/2010 | Nakakoji et al. | |
| 2010/0058475 A1 | 3/2010 | Thummalapenta et al. | |
| 2010/0083240 A1 * | 4/2010 | Siman | G06F 16/245 |
| | | | 717/144 |
| 2010/0088770 A1 | 4/2010 | Yerushalmi et al. | |
| 2010/0125913 A1 | 5/2010 | Davenport et al. | |
| 2010/0180344 A1 | 7/2010 | Malyshev et al. | |
| 2010/0229239 A1 | 9/2010 | Rozenberg et al. | |
| 2010/0251210 A1 | 9/2010 | Amaral et al. | |
| 2010/0279708 A1 | 11/2010 | Lidsrom et al. | |
| 2010/0289806 A1 | 11/2010 | Lao et al. | |
| 2011/0004631 A1 | 1/2011 | Inokuchi et al. | |
| 2011/0030061 A1 | 2/2011 | Artzi et al. | |
| 2011/0034733 A1 | 2/2011 | Funahashi et al. | |
| 2011/0035800 A1 | 2/2011 | Atcha | |
| 2011/0191855 A1 * | 8/2011 | De Keukelaere | G06F 11/00 |
| | | | 726/25 |
| 2011/0197177 A1 | 8/2011 | Mony | |
| 2011/0239294 A1 | 9/2011 | Kim et al. | |
| 2011/0239300 A1 | 9/2011 | Klein et al. | |
| 2012/0167209 A1 | 6/2012 | Molnar et al. | |
| 2012/0240185 A1 | 9/2012 | Kapoor et al. | |
| 2013/0019314 A1 | 1/2013 | Ji et al. | |
| 2013/0024942 A1 | 1/2013 | Wiegenstein et al. | |
| 2013/0167241 A1 | 6/2013 | Siman | |
| 2013/0247198 A1 | 9/2013 | Muttik et al. | |
| 2013/0312102 A1 | 11/2013 | Brake et al. | |
| 2014/0068563 A1 | 3/2014 | Saltzman et al. | |
| 2014/0109227 A1 | 4/2014 | Kalman et al. | |
| 2014/0165204 A1 * | 6/2014 | Williams | H04L 63/02 |
| | | | 726/25 |
| 2014/0281740 A1 | 9/2014 | Casado et al. | |
| 2014/0331327 A1 | 11/2014 | Maor et al. | |
| 2014/0372985 A1 | 12/2014 | Levin et al. | |
| 2015/0013011 A1 | 1/2015 | Brucker et al. | |
| 2015/0244737 A1 | 8/2015 | Siman | |
| 2015/0261955 A1 | 9/2015 | Huang et al. | |
| 2016/0182558 A1 * | 6/2016 | Tripp | G06F 21/562 |
| | | | 726/25 |
| 2017/0091457 A1 | 3/2017 | Zakorzhevsky et al. | |
| 2017/0270303 A1 | 9/2017 | Roichman et al. | |
| 2017/0289187 A1 * | 10/2017 | Noel | G06F 16/28 |
| 2018/0025161 A1 | 1/2018 | Gauthier et al. | |

FOREIGN PATENT DOCUMENTS

| | | |
|---|---|---|
| WO | 2005121953 A | 12/2005 |
| WO | 2008047351 A1 | 4/2008 |
| WO | 2016108162 A1 | 7/2016 |
| WO | 2016113663 A1 | 7/2016 |

OTHER PUBLICATIONS

Coverity Inc., "Coverity® Development Testing Platform", 5 pages, year 2012.

Chess et al., "Dynamic Taint Propagation", 70 pages, Feb. 21, 2008.

Shuai et al., "Software Vulnerability Detection Based on Code Coverage and Test Cost", 11th International Conference on Computational Intelligence and Security (CIS), pp. 317-321, 2015.

Pingali et al., "Optimal Control Dependence Computation and the Roman Chariots Problem", ACM Transactions on Programming Languages and Systems, vol. 19, No. 3, pp. 462-485, May 1997.

Sreedhar et al., "A New Framework for Elimination-Based Data Flow Analysis Using DJ Graphs", ACM Transactions on Programming Languages and Systems, vol. 20, No. 2, pp. 368-407, Mar. 1998.

Helmer et al., "A Software Fault Tree Approach to Requirements Analysis of an Intrusion Detection System", 1st Symposium on Requirements Engineering for Information Security, Indianapolis, Indiana, USA, Mar. 5-6, 2001.

Redgate, ".NET Reflector: Explore, Browse, and Analyze .NET assemblies", 2009 (www.red-gate.com/productors/reflector).

Beyer et al., "The BLAST Query Language for Software Verification", Springer-Verlag Berlin Heidelberg, pp. 2-18, year 2004.

(56) References Cited

OTHER PUBLICATIONS

Srikant et al., "Mining Sequential Patterns: Generalizations and Performance Improvements", EDBT '96 Proceedings of the 5th International Conference on Extending Database Technology: Advances in Database Technology, pp. 3-17, Avignon, France, Mar. 25-29, 1996.
Zaki, M., "SPADE: An Efficient Algorithm for Mining Frequent Sequences", Machine Learning, vol. 42, pp. 31-60, year 2001.
Pei et al., in "Mining Sequential Patterns by Pattern-Growth: The PrefixSpan Approach," IEEE Transactions on Knowledge and Data Engineering, vol. 16, No. 10, pp. 1424-1440, Oct. 2004.
Martin et al., "Finding Application Errors and Security Flaws Using PQL: a Program Query Language", OOPSLA'05, pp. 365-383, San Diego, USA, Oct. 16-20, 2005.
Yang et al., "Effective Sequential Pattern Mining Algorithms for Dense Database", National Data Engineering Workshops (DEWS), year 2006.
Ayres et al., "Sequential Pattern Mining using a Bitmap Representation", Proceedings of the eighth ACM SIGKDD International conference on Knowledge discovery and data mining, Edmonton, Canada, Jul. 23-26, 2002.
Wang et al., "BIDE: Efficient Mining of Frequent Closed Sequence", Proceedings of 2010 International Conference on Information Retrieval & Knowledge Management, pp. 270-275, Sham Alam, Selangor, Mar. 17-18, 2010.
Yan et al., "CloSpan: Mining Closed Sequential Patterns in Large Datasets", Proceedings of 2003 SIAM International Conference on Data Mining, San Francisco, USA, May 1-3, 2003.
"Design flaw in AS3 socket handling allows port probing", 2 pages, Oct. 15, 2008 (downloaded from http://scan.flashsec.org/).
Ford et al., "Analyzing and Detecting Malicious Flash Advertisements", Proceedings of ACSAC '09—Annual Computer Security Applications Conference, pp. 363-372, Honolulu, Hawaii, Dec. 7-11, 2009.
Livshits et al., "Finding Security Vulnerabilities in Java Applications with Static Analysis". Stanford University, computer science department, 60 pages, Sep. 25, 2005.
Symantec Corporation, "Symantec AdVantage: Dynamic Anti-Malvertising Solution", Data Sheet, 4 pages, year 2012.
"Zero-day attack", 4 pages, year 2008 (downloaded from http://en.wikipedia.org/wiki/Zero-day_attack).
Lange et al., "Comparing Graph-based Program Comprehension Tools to Relational Database-based Tools", IEEE 0-7695-1131-7/01, pp. 209-218, year 2001.
Skedzielewski et al., "Data flow graph optimization in IF1", Functional programming languages and computer architecture (book), publisher Springer Berlin Heidelberg, 18 pages, Aug. 22, 2013.
SAP, Java web application security best practice guide, SAP,Document version 2.0, pp. 1-48, May 2006.
Checkmarx CxQuery Language API Guide, V8.6.0 ,217 pages, Feb. 2018.
Zhenmin et al, "PR-Miner: Automatically Extracting Implicit Programming Rules and Detecting Violations in Large Software Code", ACM Sigsoft Software Engineering Notes, vol. 30, No. 5, pp. 306-315, Sep. 1, 2005.
Thummalapenta et al, "Alattin: Mining Alternative Patterns for detecting Neglected Conditions", 24th IEEE/ACM International Conference on IEEE Automated Software Engineering, pp. 283-294, Nov. 16, 2009.
Kim et al, "Supporting software development through declaratively codified programming patterns", Expert Systems with Applications, vol. 23, No. 4, pp. 405-413, Nov. 1, 2002.
Ashish et al., "Network Intrusion Detection Sequence mining—stide methodology", IT 608, Data Mining and Warehousing, Indian Institute of Technology, 8 pages, Apr. 20, 2005.
Goldsmith et al., "Relational Queries Over Program Traces", OOPSLA'05, 18 pages, Oct. 16-20, 2005.
Yamada et al., "A defect Detection Method for Object-Oriented Programs using Sequential Pattern Mining", Information Processing Society of Japan (IPSJ) SIG Technical Report, vol. 2009-CSEC-45, pp. 1-8, Jun. 15, 2009.
Fukami et al., "SWF and the Malware Tragedy Detecting Malicious Adobe Flash Files", 11 pages, Mar. 9, 2008 https://www.owasp.org/images/1/10/OWASP-AppSecEU08-Fukami.pdf.
Cova et al., "Detection and Analysis of Drive-by-Download Attacks and Malicious JavaScript Code", Proceedings of the 19th international conference on World wide web, pp. 281-290, Jan. 1, 2010.
Sotirov., "Automatic Vulnerability Detection Using Static Source Code Analysis", Internet citation, 118 pages, Jan. 1, 2005.
Lam et al., "Context-Sensitive Program Analysis as Database Queries" m ACM, PODS, 12 pages, 2005.
EP Application # 18171274.6 Search report dated Jun. 28, 2018.
Balzarotti et al., "Saner: Composing Static and Dynamic Analysis to Validate Sanitization in Web Applications", IEEE Symposium on Security and Privacy, pp. 387-401, May 18, 2018.

\* cited by examiner

USING THE SAME QUERY LANGUAGE FOR STATIC AND DYNAMIC APPLICATION SECURITY TESTING TOOLS

CROSS-REFERENCE TO RELATED APPLICATIONS

This Application claims the benefit of U.S. Provisional Application No. 62/503,970, filed 10 May 2017, which is herein incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to vulnerability assessment of computer software. More particularly, this invention relates to a query language for use in tools for static and dynamic security testing of computer software.

2. Description of the Related Art

The meanings of certain acronyms and abbreviations used herein are given in Table 1.

TABLE 1

| | Acronyms and Abbreviations |
|---|---|
| API | Application Programming Interface |
| CFG | Control Flow Graph |
| DAST | Dynamic Application Security Testing |
| DOM | Document Object Model |
| HTML | HyperText Markup Language |
| HTTP | Hypertext Transfer Protocol |
| IAST | Interactive Application Security Testing |
| J2EE | Java ® 2 Enterprise Edition |
| J2SE | Java 2 Standard Edition |
| JSON | JavaScript Object Notation |
| PTQL | Program Trace Query Language |
| SAST | Static Application Security Testing |
| SQL | Structured Query Language |
| URL | Uniform Resource Locator |
| XSS | Cross-Site Scripting |

Enterprise security solutions have historically focused on network and host security, e.g., using so-called "perimeter protection" techniques. Despite these efforts, application level vulnerabilities remain as serious threats. Detection of such vulnerabilities has been attempted by lexical analysis of source code. This typically results in large numbers of false positive indications. Line-by-line code analysis has been proposed. However, this has proved to be impractical, as modern software suites typically have thousands of lines of code. Indeed, even in relatively compact environments, such as Java 2 Standard Edition (J2SE), Java 2 Platform, Java 2 Enterprise Edition (J2EE), a runtime module may include thousands of classes.

One technique for detection of vulnerabilities is exemplified by U.S. Patent Application Publication No. 2006/0253841, entitled "Software Analysis Framework". This technique involves decompilation to parse executable code, identifying and recursively modeling data flows, identifying and recursively modeling control flow, and iteratively refining these models to provide a complete model at the nanocode level.

Another approach is proposed in U.S. Patent Application Publication No. 2004/0255277, entitled "Method and system for Detecting Race Condition Vulnerabilities in Source Code". Source code is parsed into an intermediate representation. Models are derived for the code and then analyzed in conjunction with pre-specified rules about the routines to determine if the routines possess one or more of pre-selected vulnerabilities.

Static analysis of program code is disclosed in U.S. Patent Application Publication No. 2005/0015752, entitled "Static Analysis Based Error Reduction for Software Applications". A set of analyses sifts through the program code and identifies programming security and/or privacy model coding errors. A further evaluation of the program is then performed using control and data flow analyses.

Commonly assigned U.S. Pat. No. 9,128,728 to Siman, which is herein incorporated by reference, discloses an automatic tool that analyzes application source code for application level vulnerabilities. The tool integrates seamlessly into the software development process, so vulnerabilities are found early in the software development life cycle, when removing the defects is far cheaper than in the post-production phase. Operation of the tool is based on static analysis, but makes use of a variety of techniques, for example, methods for dealing with obfuscated code.

An example of static analysis combined with dynamic analysis to detect malware is found in U.S. Patent Application Publication No. 201110239294 by Kim et al. The proposed system includes a script decomposition module for decomposing a web page into scripts, a static analysis module for statically analyzing the decomposed scripts in the form of a document file, a dynamic analysis module for dynamically executing and analyzing the decomposed scripts, and a comparison module for comparing an analysis result of the static analysis module and an analysis result of the dynamic analysis module to determine whether the decomposed scripts are malicious scripts. The system and method is said to recognize a hidden dangerous hypertext markup language (HTML) tag irrespective of an obfuscation technique for hiding a malicious script in a web page and thus can cope with an unknown obfuscation technique.

A number of query languages are known in the art for source code analysis, for example the language CxQuery. A description of the language CxQuery is available as the document *Checkmarx CxQuery Language API Guide*, V8.6.0, available on the Web site of the Assignee hereof, and which is herein incorporated by reference.

One language, known as Program Trace Query Language (PTQL), is adapted to dynamic analysis. PTQL is described in the document Goldsmith et al., *Relational Queries Over Program Traces*, OOPSLA'05, Oct. 16-20, 2005, San Diego, Calif. PTQL, which is based on relational queries over program traces, enables programmers to write queries about program behavior. A PTQL query can be executed on-line, with the aid of a compiler to instrument the program.

Application instrumentation is widely used for monitoring software performance. Dynamic security tools use this sort of instrumentation for monitoring security events. These events are collected during application runtime and are analyzed in order to determine whether an application is vulnerable. Techniques for instrumentation-based dynamic security testing of this sort are described, for example, in PCT Patent Document WO2016108162, filed Dec. 24, 2015, whose disclosure is incorporated herein by reference.

SUMMARY OF THE INVENTION

According to disclosed embodiments of the invention, a query language is adapted to configure and operate static and dynamic application security testing tools to detect application security vulnerabilities. Static Application Security Testing (SAST) involves analysis of source code. Dynamic Application Security Testing (DAST) finds security weaknesses and vulnerabilities in a running application, by employing fault injection techniques on an app, such as feeding malicious data to the software in order to identify common vulnerabilities, such as SQL injection and cross-site scripting. Another testing method, Interactive Application Security Testing (IAST) combines elements of both SAST and DAST. IAST places an agent within an application and performs its analysis in real-time, anywhere in the development process. SAST and IAST are employed in both static and dynamic testing tools to detect static vulnerabilities and dynamic security-related events. Vulnerabilities are reported in a common format by the static and dynamic security testing tools.

There is provided according to embodiments of the invention a computer-implemented method, which is carried out by formulating a query in a query language. The method is further carried out in a first mode of operation by receiving into a memory of a computer source code of a computer program to be analyzed, preparing a data flow graph from the source code, and making a first determination that the query is satisfied by an analysis of the data flow graph. Alternatively, the method is carried out in a second mode of operation by collecting runtime events during an execution of binary code of the computer program, making a second determination that the query is satisfied by an analysis of the runtime events, and responsively to the first determination or the second determination reporting a security vulnerability in the computer program.

According to a further aspect of the method, a format of the query is invariant when implemented in either the first mode of operation or in the second mode of operation.

Yet another aspect of the method is carried out in the first mode of operation by organizing the source code into a first object model and generating a first data flow model from the first object model, and in the second mode of operation by organizing the runtime events into a second object model, generating a second data flow model from the second object model, and subjecting the first data flow model or the second data flow model to the query.

According to still another aspect of the method, the first data flow model includes a first data flow graph and the second data flow model includes a second data flow graph.

According to an additional aspect of the method, organizing the runtime events includes supplying details of a Hypertext Transfer Protocol (HTTP) request, the details including a Uniform Resource Locator (URL), an input, and a header body.

According to another aspect of the method, organizing the runtime events includes supplying a file name, a line number and a method name.

According to one aspect of the method, collecting runtime events includes instrumenting the binary code at points of input and output of the computer program.

One aspect of the method is carried out by applying a first vulnerability detector to input data at the points of input, and applying a second vulnerability detector to the input data at the points of output, wherein the first vulnerability detector and the second vulnerability detector are responsive to syntax of the input data that is characteristic of an attack pattern.

There is further provided according to embodiments of the invention a data processing system for detecting security vulnerabilities in a computer program including a processor, a memory accessible to the processor, and an I/O facility linked to the processor, wherein execution of the program instructions cause the processor to perform the steps of: accepting via the I/O facility a query in a query language, and in a first mode of operation receiving via the I/O facility into the memory source code of a computer program to be analyzed, preparing a data flow graph from the source code, making a first determination that the query is satisfied by an analysis of the data flow graph, and in a second mode of operation receiving via the I/O facility binary code of the computer program, executing the binary code in the processor and collecting runtime events during the execution of the binary code, making a second determination that the query is satisfied by an analysis of the runtime events, and responsively to the first determination or the second determination reporting a security vulnerability in the computer program.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Definitions.

The term "vulnerability" refers to a section of program source or object code, which when executed, has the potential to allow external inputs to cause improper or undesired behavior. Examples of vulnerabilities include buffer overflow, race conditions, and privilege escalation.

"Control flow" refers to a logical execution sequence of program instructions beginning, logically, at the beginning, traversing various loops and control transferring statements (branches), and concluding with the end or termination point of the program.

A "control flow graph" (CFG) is a graphical representation of paths that might be traversed through a program during its execution. Each node in the graph represents a basic block, i.e., a straight-line piece of code without any jumps or jump targets; jump targets start a block, and jumps end a block. Directed edges are used to represent jumps in the control flow.

"Data flow" refers to the process within the program whereby variables and data elements, i.e., data that is stored in program memory either dynamically or statically on some external memory unit, are read from or written to memory. Data flow includes the process whereby variables or data inputs or outputs are defined by name and content and used and/or modified program execution. Data flow may be graphically represented as a "data flow graph".

A "sanitizer" as used herein refers to a procedure for correcting or eliminating user input to prevent insertion of invalid data.

The terms "source" refers to the beginning of an attack vector (typically an input). The term "sink" refers to the destination or target of the attack, e.g., a database, file system or output.

System Overview.

Figure 1:
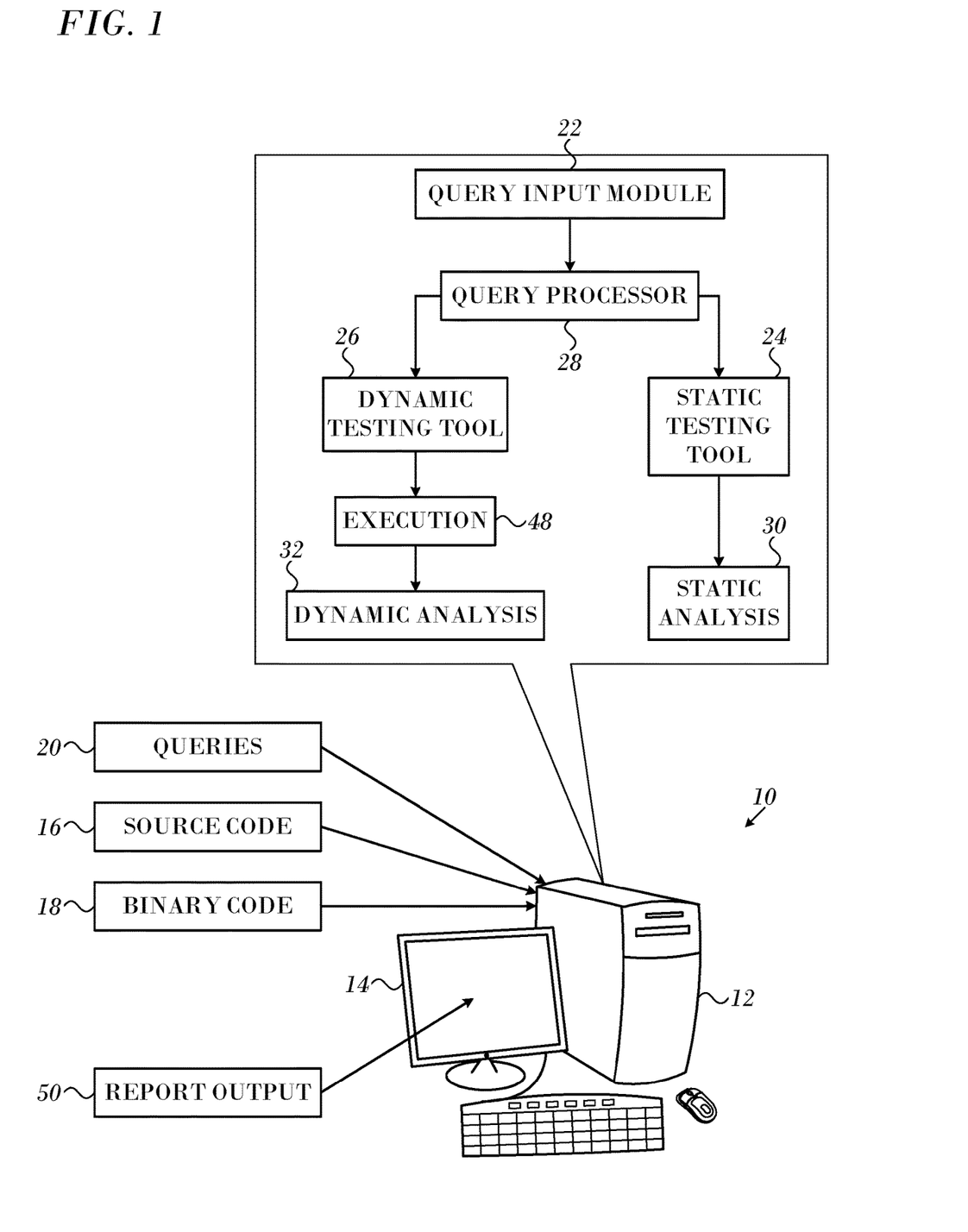
FIG. 1 is a block diagram of a system for processing computer program code, in accordance with a disclosed embodiment of the invention.

Turning now to the drawings, reference is initially made to FIG. 1, which is a block diagram of a system 10 for processing computer program code, in accordance with a disclosed embodiment of the invention. The system 10 typically comprises a general purpose or embedded computer 12, which is provided with conventional memory and I/O facilities, and programmed with suitable software for carrying out the functions described hereinbelow. Thus, although portions of the system 10 are shown as comprising a number of separate functional blocks, these blocks are not necessarily separate physical entities, but rather represent different computing tasks or data objects stored in a memory that is accessible to the processor. These tasks may be carried out in software running on a single processor, or on multiple processors. The software may be provided to the processor or processors on non-transitory media, such as CD-ROM or non-volatile memory, or may be retrieved from storage over data networks. Alternatively or additionally, the system 10 may comprise a digital signal processor or hard-wired logic. The system 10 may include a display 14, enabling an operator to interact with the system, typically via a graphical user interface.

Program code to be evaluated for security vulnerabilities comprises inputs to the system 10. The program code may be of two kinds: source code 16 and binary code 18. The binary code 18 may comprise object code modules or executable code. The system 10 is capable of testing security vulnerabilities of both the source code 16 and binary code 18. Queries 20 that detect various types of security vulnerabilities are input by an operator and initially processed in a query input module 22. The queries 20 are written in a query language, referred to herein as the "unified query language", which is discussed below. The query input module 22 submits the queries 20 to query processor 28, which directs them to either a static testing tool 24 or a dynamic testing tool 26. The query input module 22, query processor 28, static testing tool 24 and dynamic testing tool 26 may execute in the computer 12 (or in other computers in a distributed environment). The dynamic testing tool 26 can be the tool disclosed in commonly assigned application Ser. No. 15/535,732, entitled Code Instrumentation for Runtime Application Self-Protection, which is herein incorporated by reference.

SAST.

The static testing tool 24 applies queries 20 to the source code 16, is parsed and organized into a code data model", such as a hierarchical Document Object Model (DOM). Some tools, such as the SAST tool described in the above-noted U.S. Pat. No. 9,128,728, also build data and control flow graphs. The code data model, including any data flow graphs, form part of a combined data model, which is used by both static analysis module 30 and dynamic analysis module 32.

Figure 2:
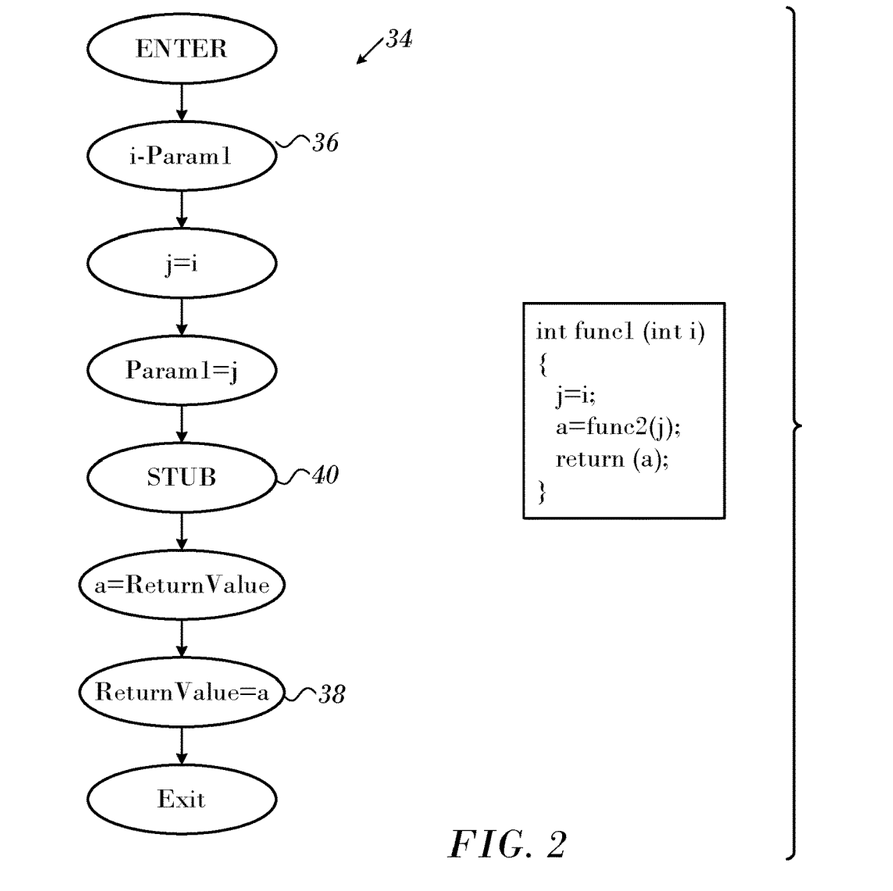
FIG. 2 is a control flow graph in accordance with a disclosed embodiment of the invention.

Reference is now made to FIG. 2, which is a simplified invocation-aware single method control flow graph 34, of the sort produced by the static testing tool 24 (FIG. 1) in accordance with a disclosed embodiment of the invention. The control flow graph 34 has nodes 36, 38 representing a prolog and an epilog, respectively. A stub 40 for the called function, func2( ), is included, because in this example source code is unavailable for the called function func2( ).

Figure 3:
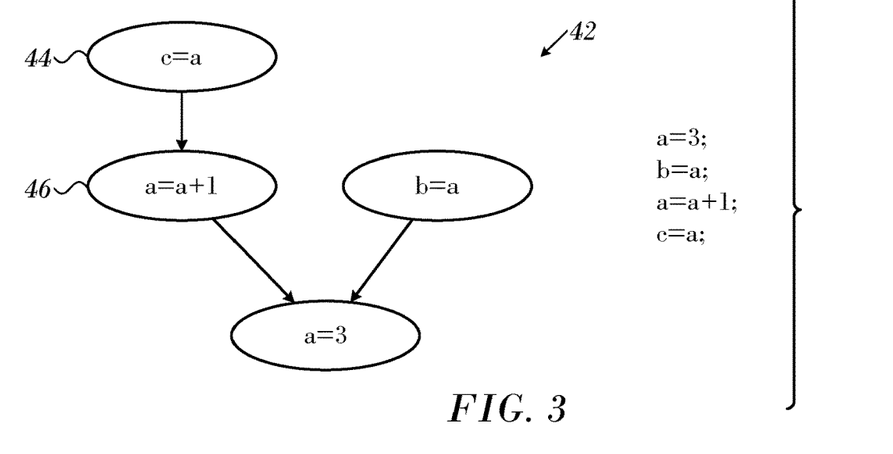
FIG. 3 is a data flow graph in accordance with a disclosed embodiment of the invention.

Reference is now made to FIG. 3, which is a data flow graph 42 of the sort produced by the static testing tool 24 (FIG. 1) in accordance with a disclosed embodiment of the invention. A data flow graph describes data flow within a single method. Each time a value is assigned to a variable, the influencing object and the location of the assignment is recorded. As result, a graph can be constructed, in which the data flow nodes are variables in a specific location, and connections represent dependency. The graph is transitive. Thus, a backward transitive closure computed at a specific location retrieves all influencing variables. It will be noted that each node is directed to a node that affects or influences it. For example, in node 44, the assigned value of the variable "c" is influenced by an assignment to a variable "a" in node 46.

Construction of the control flow graph 34 and data flow graph 42 is described in further detail in the above-noted U.S. Pat. No. 9,128,728.

DAST.

DAST approaches the application as a "black box," and attempts to find vulnerabilities by bombarding the application during runtime with potentially harmful inputs. The dynamic testing tool 26 operates on the binary code 18, for example by recompiling and instrumenting the binary code 18 by known techniques to accommodate the queries 20. For example, code instrumentation and selected inputs may be injected by an interactive application security testing (IAST) agent in order to track relevant points in the input flow. When the binary code is executed in an execution module 48 the flow of the program is captured. Runtime events are collected and analyzed in the dynamic analysis module 32.

One suitable method of dynamically detecting program vulnerabilities is disclosed in the above-noted application Ser. No. 15/535,732. Briefly, instrumentation is targeted at two specific points in the program flow:

(1) Inputs at which the program receives data from users or other data sources; and (2) Outputs at which the program submits queries or other instructions to sensitive targets, such as databases or file systems, or HTML outputs of Web applications.

During runtime, the instrumented application gets inputs and creates outputs as part of its regular workflow. Each input data that arrives at an instrumented input (source) point is checked by one or more vulnerability sensors, which examine the input for syntax that is characteristic of attack patterns, such as SQL injection, cross-site scripting (XSS), file path manipulation, and JavaScript Object Notation (JSON) injection. Matching of regular expressions may be used for this purpose. When an input is identified as potentially malicious by one of these sensors, it is saved in a cache for a certain period of time (for example, one minute) or until the cache is full. Both cache capacity and saving time duration are configurable. For each saved input, the cache also holds a flag indicating the vulnerabilities to which the input may be relevant, along with other pertinent metadata, such as time, stack trace, and context. Aside from caching the suspicious input, the application workflow continues without interruption.

When the application workflow arrives at an instrumented output, the cache of recent inputs is checked again by vulnerability detectors that are applicable to the specific target of the output. For example, an SQL injection detector may be invoked for database targets, an XSS detector for HTML outputs, and a file manipulation detector for file system APIs. Depending on the type of target, the detector applies appropriate detection logic to the relevant cached inputs in order to detect potentially harmful patterns using detection logic that is appropriate for the target. When the logic finds an input that matches the detection criteria for the current target, an alert is raised, and other preventive action may be taken as well, such as blocking or cleansing the input or even halting the application entirely. If the context of the flow from the input to the output is known, relevant malicious inputs found by the vulnerability sensors are passed only to the appropriate detectors for the relevant targets.

Reports.

Referring again to FIG. 1, the outputs of the static analysis module 30 and dynamic analysis module 32 contribute to vulnerability reports 50, which are contributed by the static analysis module 30 and the dynamic analysis module 32, and may be presented on the display 14 or transmitted to another I/O device (not shown).

The extended data models of both SAST & IAST may be correlated, using the unified query language, as each data model has its own "blind spots" and its own advantages. The query exploits both in order to get improved results. The run-time results of dynamic IAST can be used in order to validate SAST results, which are sometimes doubtful. The combined vulnerability reports 50 add valuable information for the software developer in proving that vulnerabilities identified by SAST have actually been fixed.

On the other hand, queries in SAST can extend coverage by analyzing code areas that are not accessed during IAST, as well as adding awareness of potentially vulnerable code areas and guiding the tester to extend IAST testing to cover such areas. The use of a single query language can reduce or eliminate the need for manual comparisons of SAST and IAST results.

Query Language.

The unified query language provided by embodiments of the present invention enables users to define their own procedures in a generic and flexible way. The same query format and rules are used for both static and dynamic testing systems, i.e., the format of the query is invariant when applied to any or all of SAST, DAST or IAST. However, the implementation of the queries and rules differ between the dynamic and static testing methods. For example, a query for SQL injection vulnerabilities in the unified query language results in an analysis of different type of data received from the static and dynamic tools.

Figure 4:
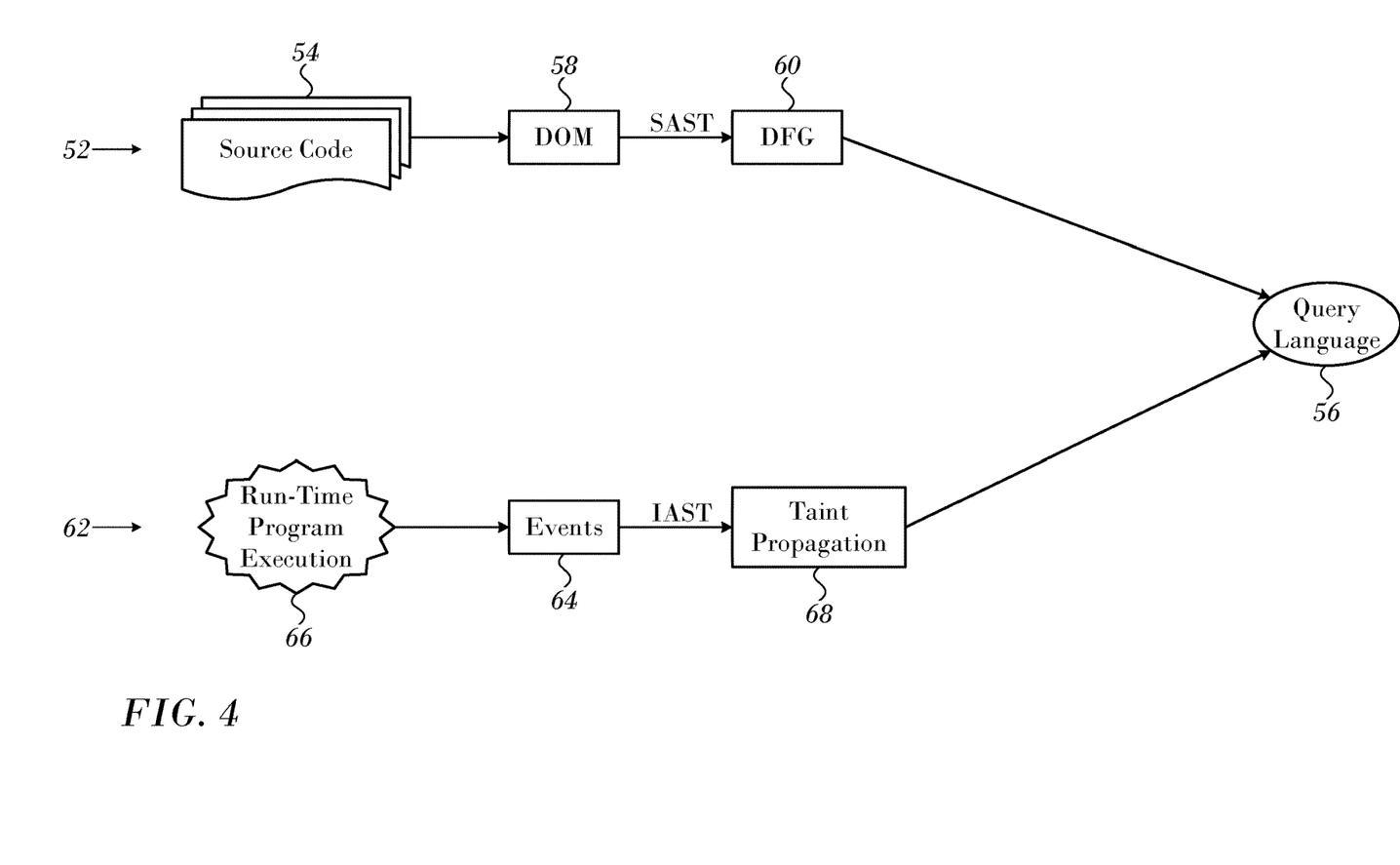
FIG. 4 is a diagram outlining the application of a query language in accordance with an embodiment of the invention.

The scheme for identifying such vulnerabilities applies to each type of data. The scheme is shown in FIG. 4, which is a diagram outlining the application of a common query language to expose vulnerabilities by SAST and IAST techniques. In upper branch 52 of the diagram, source code 54 is conditioned for SAST and application of query language 56 by construction of an object-oriented model, DOM 58 of the source code 54 by assigning respective identifiers to member variables. Based on the DOM 58 a control flow graph (not shown) and a control dependence graph (not shown) can be prepared and a data flow graph, DFG 60 derived from the control flow graph. The control flow graph, control dependence graph and data flow graph, or combinations and subcombinations thereof are analyzed to identify security vulnerabilities in the source code 54. Details of this process are known from the above-noted U.S. Pat. No. 9,128,728.

In lower branch 62 events 64 are collected at run-time of a program 66 prepared for execution from the source code 54. The events 64 are represented in a normalized format, comparable to the elements of the DFG 60 and analyzed for taint propagation in block 68. The result is a mutually compatible format for analysis of the source code 54 and the events 64. Queries submitted in the query language 56 may be addressed to an analysis of the DFG 60 or to the taint propagation analysis in block 68 or both of them. A query processor, discussed below, directs the queries to the appropriate analysis tool. The query language 56 is agnostic as to whether its queries concern the DFG 60 or the block 68.

For example, to look for SQL injection vulnerabilities, the user might define and apply the following query:

result=inputs.influencedAndNot Sanitized(db, sanitizers), where db is data being analyzed.

The same procedures in the query language are applied to databases containing both static and dynamic test results, for example queries of the form:

sources.influencingOnAndNotSanitized(sinks, sanitizers).

The data captured by dynamic testing, i.e., runtime testing, includes a data flow that can be reproduced during tests. Such tests can be manually initiated, automated, or can be a record in a production environment. In any case the tests can be analyzed by queries written in the unified query language in order to find security vulnerabilities.

Normalization of Data.

To apply the same query language to both SAST and IAST results, it is necessary that data provided by both testing system will be in a proper form for querying. The following sections will present some examples in this regard.

Regarding SAST, the following exemplary queries are directed to the DOM:

Query 1.

inputs=All.FindByMemberAccess("HttpServerRequest.getQueryString");

Query 1 finds in the source code all calls to method getQueryString in the instance of API HttpServerRequest.

Query 2.
    db=All.FindByMemberAccess("jdbc.exec");
    Query 2 finds in the source code all calls to method exec in an instance of the API jdbc.
Query 3.
    replace=All.FindByMemberAccess("String.replace", "'");
    Query 3 finds in the source code all calls to the method replace of a method String, which replace an apostrophe in a string of characters.

Regarding IAST, queries evaluate events reported by the instrumented application during runtime. As in the case of SAST, events collected by IAST are organized in a DOM and a data flow model is produced based on the DOM for purposes of querying. The events are triggered and reported at instrumented locations in the code. Thus, for example, to run Query 1 on IAST events, the method HttpServerRequest.getQueryString should be instrumented prior to searching for query results. For this reason, applying the unified query language to the IAST tool should not only invoke a search for events after analyzing the application at runtime (post-action), but should also define the instrumentation of the application (pre-action). If a user writes a query like Query 1, then the dynamic testing tool 26 (FIG. 1) automatically generates instrumentation prior to running the application. Only after running the instrumented application, when relevant events have arrived, is the query actually applied and results analyzed.

To find some types of vulnerabilities, such as SQL Injection, using SAST, it is possible to use both the DOM and the Data Flow Graph, and to detect a vulnerability if there is a path between the node of an input API and the node of a database (DB) API that does not go through a node having a sanitizer API. Thus, to detect an SQL injection vulnerability, Queries 1-3 can first be applied to the DOM model in order to find relevant APIs of inputs, DB and sanitizers. All three queries produce a search of the DOM to find all code elements satisfying the queries.

After performing any portion of Queries 1-3, the following query can then be used to search for a path between the input API and of DB API that does not go through a sanitizer node:
Query 4.
    result=inputs. InfluencingAndNotSanitized(db, replace);
    In IAST there is no source code, and thus there is no DOM or Data Flow Graph built from the source code as for SAST. Therefore, in an embodiment of the present invention, the IAST data model is normalized to supply data in a form very similar to SAST, so that SAST queries can run without modification. The IAST Data Flow Graph is built not from the source code, but rather from instrumentation events that IAST creates during run-time of the application.

For example, when the code in Listing 1 is executed:

---
Listing 1
---
String s1 = "abc";
String s2 = s1.toUpperCase( );
--- and there is instrumentation at the entry point of the method String.toUpperCase, the dynamic testing tool 26 will register a new event involving an application call to the method 'toUpperCase' with a value of 'abc'.

Specifically, for the above example of detecting SQL Injection vulnerabilities, the dynamic testing tool 26 instruments the APIs of inputs, DB and sanitizers so when they are called, the dynamic testing tool 26 receives notifications. The SAST query presented above for SQL Injection vulnerabilities defines IAST instrumentation for three APIs:
    API 1: HttpServerRequest.getQueryString.
    API 2: jdbc.exec.
    API 3: String.replace.

The query processor 28, upon receiving Query 4, instructs the dynamic testing tool 26 to instrument APIs 1-3. Now when the application runs with this instrumentation, events are generated each time one of these three APIs is called. These events contain metadata indicating, which API was called and with what parameter values. For example, when API 3 (String.replace) is called, the dynamic testing tool 26 generates an event reporting the call and the parameter values. Applying Query 4 can indicate if API String.replace was triggered on an apostrophe. After receiving all events from a run of the instrumented application, the dynamic analysis module 32 can correlate them in order to determine, for example, whether there is a reported event associated with input API 1 (HttpServerRequest.getQueryString) and a reported event associated with invocation of API 2 (jdbc.exec), without a reported event associated with replacement of an apostrophe by the method replace in API 3. In such a combination, the dynamic analysis module 32 would report an SQL injection vulnerability.

In a more specific scenario regarding Query 4, the dynamic analysis module 32 may process the following events:
1. HttpServerRequest.getQueryString, param1='name', return='Alex' (meaning that the call to HttpServerRequest.getQueryString was executed with a parameter 'name' and it returned 'Alex').
2. jdbc.exec, param1='select * from t where name='ALEX'' (meaning that the call to jdbc.exec was executed with a parameter of an SQL statement).

When the dynamic analysis module 32 analyzes these events, it reports an SQL injection vulnerability, since there are events involving input and data without the subsequent sanitizer of a replace event. The processor can determine that the value 'Alex' was received via the input API and possibly was changed before being incorporated in an SQL statement by applying techniques of data taint propagation as described, e.g., in the document *Dynamic Taint Propagation*, Brian Chess et al., (21 Feb. 2008), available online. Data taint propagation provides a flow of connected events, including, for example, an ordered sequence of events representing the actual data flow from a source (like input) to sink (like a database) and all data propagators between them. In this example, the dynamic analysis module 32 would detect that 'ALEX' inside the SQL statement flowed from the value 'Alex' that was received from an input.

The dynamic testing tool 26 provides not only the events in executed methods, but also the sequence of calls connected to the propagation of the values.

---
Listing 2
---
String s1 = "abc";
String s2 = s1.toUpperCase( );
String s3 = s2 + "def";
---

When the code in Listing 2 is executed a trace would show that 'abc' was changed into 'ABC' by ' the method toUpperCase' and then was concatenated with 'def' to eventually produce the string 'ABCdef'.

A data propagator is a method that propagates a value from its inputs (parameters) to its output (return). For example the method 'toUpperCase' in Listing 2 is a data propagator. There are many propagators in the flow of data during execution of a program. When data enters an application from an external source (such as a user input), a source API is triggered to supply the data and mark it as "tainted." Any data received from the outside is assumed to be tainted. Any propagator will propagate the taint of data it receives, with the exception of special sanitizer propagators: Once a flow passes through a sanitizer, the presumption that the data is tainted is overcome, and the data is regarded as untainted. However, if tainted data is received at the sink, it means that there is a flow from the source to the sink that has not passed through sanitization. Tainted data at the sink constitutes a security vulnerability.

Now by using instrumentation for methods of sources, sinks and propagators and using taint propagation analysis. To accomplish this, the dynamic testing tool 26 can extract sequences of method calls representing a flow of data from a source to a sink. Such flows contain nodes with method call information and edges representing propagation from one node to another.

Listing 3

```
String input = request.getQueryString("name");
String s = input.substring(1);
s = s.toUpperCase( );
s = "select * from t where name = '" + s + "'";
jdbc.exec(s);
```

For example, the code in Listing 3 produces the following sequence of events:

request.getQueryString→String.substring→String.toUpperCase→concat→jdbc.exec.

This sequence is similar to a data flow graph, since it has the form of a connected graph in which nodes contain source commands, such as input and Output APIs, and there is a directed edge between two nodes if there is a data flow between the two corresponding commands.

We again consider queries 1-4, which are reproduced in Listing 4, but now in the context of IAST. SAST and IAST are not generally conducted simultaneously. Thus, query processor 28 is instructed in a given session to direct queries such as queries 1-4 to the dynamic testing tool 26, rather than the static testing tool 24.

Listing 4

```
inputs =
All.FindByMemberAccess("HttpServerRequest.getQueryString");
db = All.FindByMemberAccess("jdbc.exec");
replace = All.FindByMemberAccess("String.replace", "");
result = inputs.InfluencingAndNotSanitized(db, replace);
```

The queries of Listing 4 search for sequences of events starting from an input API (getQueryString), not passing through a sanitizer API (replace), and ending with the DB API (exec) (not shown in Listing 4). The syntax of the queries of Listing 4 is the same as in the SAST application applied to queries 1-4, but a different, complementary search is invoked when these queries are applied to runtime events. By instrumenting sources, sinks and propagators and using taint propagation techniques, it is possible to create a sequence of events in a format substantially identical to the SAST Data Flow Graph, and thus use the same queries for both SAST and DAST.

Example.

The following is an example of how an SAST Query Language, such as the above-mentioned language CxQuery, can be used in querying IAST results, without changing the query syntax. For this purpose, the dynamic testing tool 26 should supply the following data in connection with relevant events:

1). Information concerning an HTTP request containing URL, inputs, headers body, as shown in Listing 5.

2.) Information regarding data propagation, such as file name, line, method name, type name, and other propagation information Listing 5

```
"url":
    "http://10.0.0.128:8090/WebGoat/attack?Screen=101829144&menu=1100",
"httpMethod": "POST",
"httpHeaders":"content-length=22
    referer=http://cxiast.ddns.net:8090/WebGoat/start.mvc accept-
    language=en-US, en; q=0.8
    cookie=JSESSIONID=3A69A5CCC5015995ACE9D1D551777AD7
    origin=http://cxiast.ddns.net:8090 host=cxiast.ddns.net:8090 x-
    requested-with=XMLHttpRequest connection=keep-alive content-
    type=application/x-www-form-urlencoded; charset=UTF-8 accept-
    encoding=gzip, deflate accept=*/* user-agent=Mozilla/5.0
    (Windows NT 6.1; WOW64) AppleWebKit/537.36 (KHTML, like
    Gecko) Chrome/55.0.2883.87 Safari/537.36",
"httpBody":
    "Screen=101829144&menu=1100&station=102&SUBMIT=Go!",
"httpParamName": "station
```

Listing 6 is a trace of data provided by an IAST tool such as the dynamic testing tool 26 on which an SQL injection query can be run and can detect the presence of an SQL injection vulnerability. The format of the data in Listing 6 is normalized to the format of data used in SAST analysis. Thus, IAST queries input to query input module 22 in a query language such as CxQuery, can be processed by the query processor 28 and the dynamic analysis module 32, just as the query processor 28 and static analysis module 30 treat SAST queries.

The trace in Listing 6 contains four steps, starting from input and ending with DB. Based on data collected from the monitored application during runtime by IAST instrumentation, the query processor 28 is able to apply the query language, determine that dynamic testing tool 26 is appropriate for testing, and cause the presence of a vulnerability to be detected by the dynamic analysis module 32.

Listing 6

```
{
"sequenceId": 0,
"file": "org/owasp/webgoat/session/ParameterParser.java",
"line": 503,
"methodName": "getParameterValues",
"typeName": "javax.servlet.ServletRequest",
"value": "102",
"taintedStartIndex": 0,
"taintedEndIndex": 2,
"codeSnippet": " String[ ] values =
    this.request.getParameterValues(name);",
"paramValue": "station"
},
```

-continued

Listing 6

```
{
"sequenceId": 1,
"file": "org/owasp/webgoat/lessons/SqlNumericInjection.java",
"line": 105,
"methodName": "append",
"typeName": "java.lang.StringBuilder",
"value": "SELECT * FROM weather_data WHERE station = 102",
"taintedStartIndex": 43,
"taintedEndIndex": 45,
"codeSnippet": " query = "SELECT * FROM weather_data WHERE
    station = " + this.station;",
"paramValue": "102"
},
{
"sequenceId": 2,
"file": "org/owasp/webgoat/lessons/SqlNumericInjection.java",
"line": 105,
"methodName": "toString",
"typeName": "java.lang.StringBuilder",
"value": "SELECT * FROM weather_data WHERE station = 102",
"taintedStartIndex": 43,
"taintedEndIndex": 45,
"codeSnippet": " query = "SELECT * FROM weather_data WHERE
    station = " + this.station;"
},
{
"sequenceId": 3,
"file": "org/owasp/webgoat/lessons/SqlNumericInjection.java",
"line": 118,
"methodName": "executeQuery",
"typeName": "java.sql.Statement",
"value": "SELECT * FROM weather_data WHERE station = 102",
"taintedStartIndex": 43,
"taintedEndIndex": 45,
"codeSnippet": " ResultSet results = statement.executeQuery(query);",
"paramValue": "SELECT * FROM weather_data WHERE station = 102"
}
```

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A computer-implemented method for detecting security vulnerabilities in a computer program, comprising the steps of:
   receiving, into a memory of a computer, source code of at least one computer program to be analyzed;
   preparing a first data flow graph from the source code of one or more of the at least one computer program, using a static testing analysis;
   defining instrumentation for specific runtime event collection for the computer program during execution utilizing a unified query language;
   applying the instrumentation to one or more of the at least one computer program;
   preparing a second data flow graph from collected runtime events obtained from executing the instrumented one or more of the at least one computer program;
   normalizing results from the generated static testing analysis and from the execution of the instrumented one or more of the at least one computer program;
   applying one or more user received queries to the results, wherein the user received queries are in a query language; and
   displaying in a reporting manner, identified security vulnerabilities in one or more of the at least one computer program, wherein the identified security vulnerabilities are based on the results of the user received queries.

2. A data processing system for detecting security vulnerabilities in a computer program comprising:
   a processor;
   a memory accessible to the processor storing program instructions and data objects therein; and
   an I/O facility linked to the processor;
   wherein execution of the program instructions cause the processor to perform the steps of:
   accepting via the I/O facility queries in a query language;
   receiving via the I/O facility into the memory source code of at least one computer program to be analyzed;
   preparing a first data flow graph from the source code of one or more of the at least one computer program, using a static testing analysis;
   defining instrumentation for specific runtime event collection for the computer program during execution utilizing a unified query language;
   applying the instrumentation to one or more of the at least one computer program;
   preparing a second data flow graph from collected runtime events obtained from executing the instrumented one or more of the at least one computer program;
   normalizing results from the generated static testing analysis and from the execution of the instrumented one or more of the at least one computer program;
   applying one or more user received queries to the results, wherein the user received queries are in a query language; and
   displaying in a reporting manner, identified security vulnerabilities in one or more of the at least one computer program, wherein the identified security vulnerabilities are based on the results of the user received queries.

3. The system according to claim 2, wherein preparing the second data flow graph comprises organizing the collected runtime events in a hierarchical Document Object Model (DOM) and producing the second data flow graph based on the DOM.

4. The system according to claim 2, wherein defining the instrumentation comprises defining the instrumentation of the one or more of the at least one computer program responsive to a received query, which is applied to the second data flow graph after executing the instrumented one or more of the at least one computer program.

5. The system according to claim 2, wherein preparing the second data flow graph comprises preparing the second data flow graph in a form very similar to the form of the first data flow graph using the static testing tool, such that queries prepared for the form of the first data flow graph can run on the second data flow graph without modification.

6. The system according to claim 2, wherein collecting runtime events comprises generating an event each time an instrumented Application Programming Interface (API) is called in running the program and collecting for each event an indication of the API called and parameter values with which the API was called.

7. The system according to claim 2, wherein preparing the second data flow graph comprises forming a graph in which nodes contain source commands and a directed edge is placed between two nodes if a data flow occurred between the two corresponding commands of the nodes.

8. The system according to claim 2, wherein applying the received queries comprises applying a specific query to both the first and second data flow graphs.

9. The method according to claim 1, wherein preparing the second data flow graph comprises organizing the collected runtime events in a hierarchical Document Object Model (DOM) and producing the second data flow graph based on the DOM.

10. The method according to claim 1, wherein defining the instrumentation comprises defining the instrumentation of the one or more of the at least one computer program responsive to a received query, which is applied to the second data flow graph after executing the instrumented one or more of the at least one computer program.

11. The method according to claim 1, wherein preparing the second data flow graph comprises preparing the second data flow graph in a form very similar to the form of the first data flow graph using the static testing tool, such that queries prepared for the form of the first data flow graph can run on the second data flow graph without modification.

12. The method according to claim 1, wherein collecting runtime events comprises generating an event each time an instrumented Application Programming Interface (API) is called in running the program and collecting for each event an indication of the API called and parameter values with which the API was called.

13. The method according to claim 1, wherein preparing the second data flow graph comprises forming a graph in which nodes contain source commands and a directed edge is placed between two nodes if a data flow occurred between the two corresponding commands of the nodes.

14. The method according to claim 1, wherein applying the received queries comprises applying a specific query to both the first and second data flow graphs.

15. The method according to claim 1, wherein applying the instrumentation comprises instrumenting at points of input and output of the computer program.

16. The system according to claim 2, wherein applying the instrumentation comprises instrumenting at points of input and output of the computer program.

\* \* \* \* \*